I. L. STANGER & C. B. FITHIAN.
ADJUSTABLE SEAT.
APPLICATION FILED MAR. 8, 1912.
1,065,280.          Patented June 17, 1913.
2 SHEETS—SHEET 1.
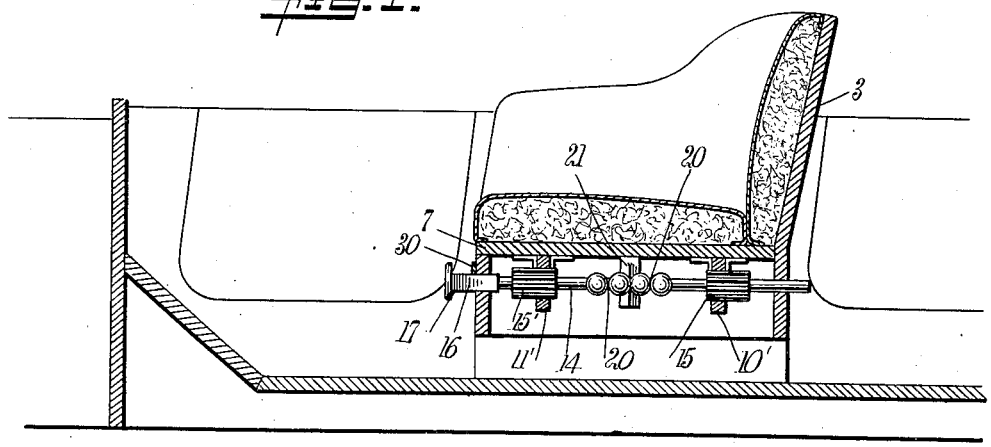
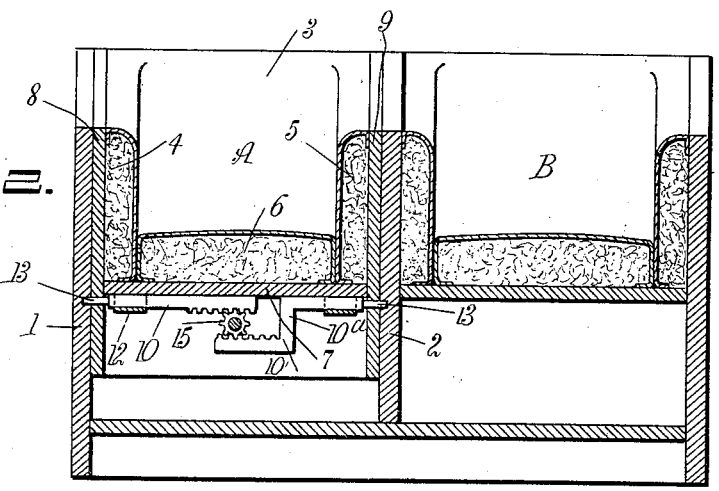
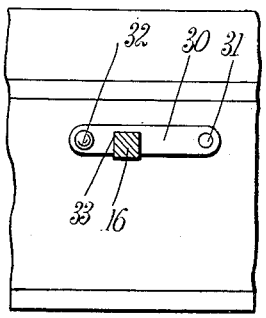
WITNESSES
G. Robert Thomas
L. J. Gallagher
INVENTORS
Ira L. Stanger
Charles B. Fithian
BY
Munn & Co
ATTORNEYS I. L. STANGER & C. B. FITHIAN.
ADJUSTABLE SEAT.
APPLICATION FILED MAR. 8, 1912.
1,065,280.    Patented June 17, 1913.
2 SHEETS—SHEET 2.
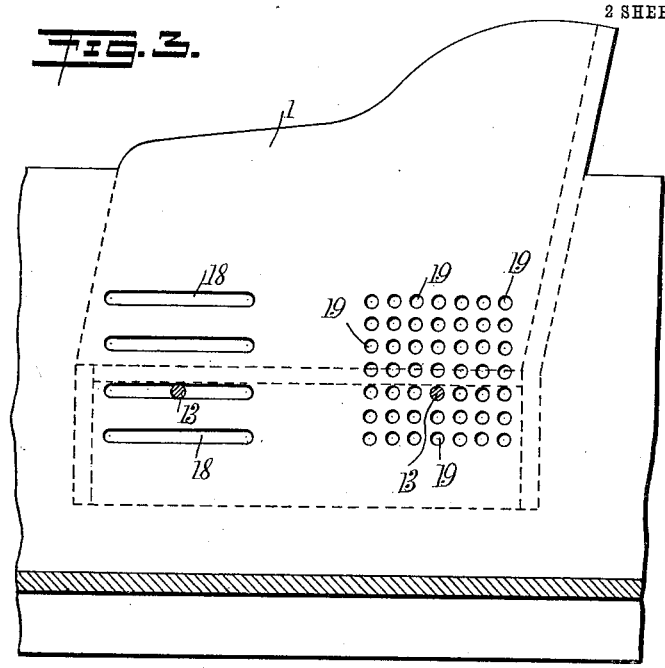
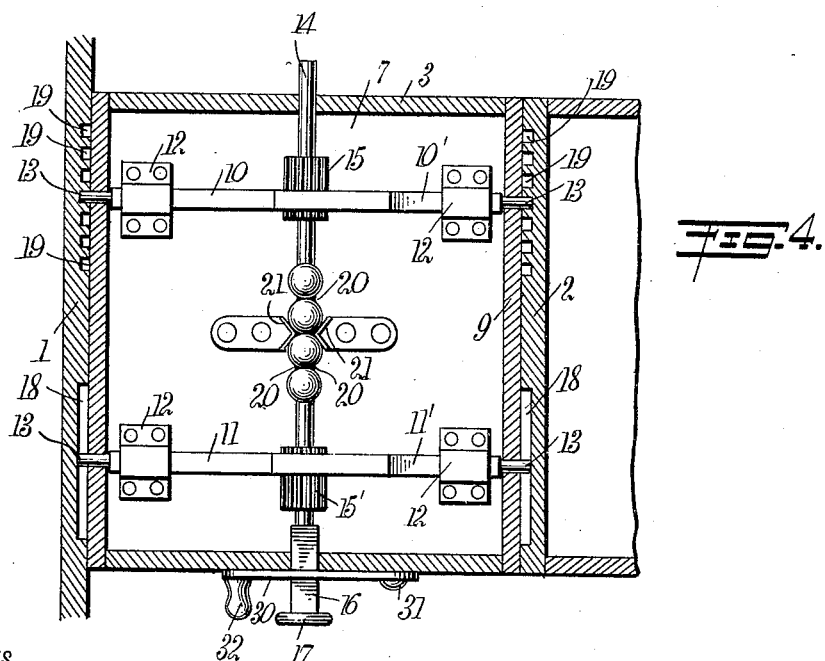
WITNESSES
G. Robert Thomas
L. J. Gallagher
INVENTORS
Ira L. Stanger
Charles B. Fithian
BY Munn & Co
ATTORNEYS

UNITED STATES PATENT OFFICE.

IRA L. STANGER, OF PENSAUKEN, NEW JERSEY, AND CHARLES B. FITHIAN, OF PHILADELPHIA, PENNSYLVANIA.

ADJUSTABLE SEAT.

1,065,280.  Specification of Letters Patent.  Patented June 17, 1913.

Application filed March 8, 1912. Serial No. 682,346.

*To all whom it may concern:*

Be it known that we, IRA L. STANGER, a citizen of the United States, and a resident of Pensauken, in the county of Camden and State of New Jersey, and CHARLES B. FITHIAN, a citizen of the United States, and a resident of Philadelphia, in the county of Philadelphia and State of Pennsylvania, have invented a new and Improved Adjustable Seat, of which the following is a full, clear, and exact description.

Our invention relates generally to adjustable and removable seats and more particularly it is directed to one especially adapted for use on vehicles and more especially automobiles.

The principal object of our invention is to provide a new and improved adjustable seat and means whereby it may be moved to different relative positions, thereby adapting it to the comfort and convenience of different people.

A further object of our invention is to provide a new and improved means for adjusting the seat relatively to its support which can be done in a short time, the parts being few and the operation being simple.

Other objects and advantages of the invention will appear as the description thereof proceeds, the new and useful features being particularly pointed out in the appended claims.

Reference is to be had to the accompanying drawings forming a part of this specification, in which similar characters of reference denote corresponding parts in all the views, and in which—

Figure 1 is a partial vertical sectional view of an automobile embodying an adjustable seat; Fig. 2 is a partial vertical sectional view at right angles to Fig. 1; Fig. 3 is an inside end view of the supporting member; Fig. 4 is a horizontal sectional view through the seat and the supporting member; Fig. 5 is a detail view of the locking member; Fig. 6 is a partial vertical sectional view showing the securing means for the longitudinally movable shaft.

Referring particularly to Fig. 1, A and B respectively denote two seats, one of which, B, is not adjustable, the other of which, A, is adjustable and embodies the new and improved structure set forth in the specification and drawings. While these seats are shown in Figs. 1 and 2 embodying an automobile construction, it is, of course, obvious that the inventive idea may be availed of in many different instances, the purpose of which in each case is identical.

The support for the adjustable seat A embodies the vertically extending portions 1, 2, the seat itself being made up of the back 3 and sides 4, 5, together with the bottom 6, the parts 3, 4, 5 and 6 being preferably upholstered; the bottom 6 embodies, also, the rigid support 7, while the sides 4 and 5 embody the rigid portions 8, 9, respectively. The portions 3, 7, 8 and 9, form a frame or chair, or seat, which is movable bodily within the support or may be taken out as desired.

Referring particularly to Fig. 4 wherein the construction of the under side of the rigid support 7 is set forth, a plurality of coöperating racks 10, 10′, and 11, 11′ are mounted in suitable supports 12 of any desired construction, preferably straps, which are positioned at diametrically opposite points on the bottom of the rigid support 7. The outer end of each rack is provided with an extension 13, all of the extensions being preferably of tapered construction and alike in length and diameter. Each pair of racks is designed to be actuated by means of a shaft 14 having pinions 15, 15′ thereon, the front end of the shaft being preferably squared, as at 16, and provided with a hand wheel 17.

Referring particularly to Fig. 2, it will be noted that the racks 10′, 11′ are preferably provided with intermediate inwardly bent portions, one of which is shown at 10ª, whereby the teeth on adjacent sides of the inner ends of the racks may engage with the pinions 15, 15′; turning of the hand wheel 17 turns the shaft 14, thereby moving the racks 10, 10′, in opposite directions as well as the racks 11, 11′, the outer ends 13 of the racks being thereby moved relatively to the sides 1, 2, of the support.

Referring particularly to Figs. 3 and 4, it will be noted that adjacent sides of the fixed supports 1, 2, which form the frame within which the seat is adjustable are provied with longitudinally extending recesses or slots 18 adjacent the front ends and with a number of smaller recesses or sockets 19 adjacent the rear ends, the slots 18 being positioned one above the other and being adapted to receive the extensions at the outer ends of the racks 11, 11', while the sockets 19, which may be of any desired number, are suitably positioned in order to receive the extensions at the outer ends of the racks 10, 10'.

It is obvious that the seat may be variously positioned between the fixed supports 1, 2, by entering the extensions 13 carried by the racks 10, 10', in different sockets 19, whereby the elevation of the rear end of the seat 6 is controlled, and by entering the extensions 13 on the racks 11, 11', in different slots 18 whereby the elevation of the front end of the seat 6 is regulated.

The pinions 15, 15' are of such length and are so positioned on the shaft 14 that this shaft may be moved longitudinally in order to carry either pinion out of engagement with the coöperating racks, thereby providing for raising and lowering the rear or front of the seat independently, the extensions of the racks not engaged by the pinion forming the points of pivotal support about which the seat may turn. In order to provide for simple and efficient operation of the device, the shaft 14 is provided at an intermediate portion with a plurality of recesses 20 at opposite sides thereof, the under side 7 of the seat being provided with downwardly extending resilient members 21 positioned on opposite sides of the shaft 14, these members being adapted to enter into opposite recesses 20, as shown in Fig. 4. These resilient members engage the middle recesses 20 so that both of the pinions are retained in engagement with their respective racks, it being clear that by pulling outwardly on the hand wheel 17, the pinion 15' may be taken out of engagement with the racks 11, 11', leaving the pinion 15 in engagement with the racks 10, 10'; the hand wheel 17 may be pushed inwardly, thereby carrying the middle recesses 20 out of engagement with the resilient members 21, the pinion 15 being then out of engagement with the racks 10, 10', the pinion 15' being left in engagement with the racks 11, 11'. In either event, turning of the hand wheel 17 will move the racks so engaged so that either the front or rear of the seat may be raised or lowered, thereby providing for proper elevation adapted to a particular person. It is also clear that the front and rear of the seat within the supporting members 1, 2, may also be controlled by moving the racks 10, 10' in order to carry the outer ends 13 out of engagement with the sockets 19 and moving the seat bodily forwardly, the ends 13 of the racks 11, 11' remaining in the slots 18; after the seat has been given any movement in order to bring it to proper elevation or position, the hand wheel 17 is turned, thereby bringing the extensions 13 of the proper racks into the proper sockets. The provision of the recesses 20 enables the proper position of the hand wheel 17 to be determined when it is desired to make any adjustment of the seat, it being noted that the hand wheel and shaft is maintained in such position until moved in either direction against the pressure of the resilient members 21. As previously noted, the forward end of the shaft 14 is preferably square, as at 16, the squared end being mounted in an opening of suitable size in the front member of the seat, the squared portion coöperating with a suitable locking device, shown particularly in Fig. 5, and which embodies a strap 30 pivotally mounted at 31, one end of the strap being provided with a suitable handle 32, the intermediate portion of this strap being provided with a recess 33 adapted to receive and extend around the squared portion 16 of the shaft. This locking device prevents movement of the shaft save when it is desired to adjust the parts, thereby providing for safety when using the seat and security when it is positioned.

While it is intended to make use of the construction, herein shown and claimed, principally in automobiles, it is, of course, clear that the inventive idea of an adjustable seat as set forth may be used in many cases, such different uses not departing from the spirit of the invention as defined in the appended claims.

Having thus described our invention, we claim as new, and desire to secure by Letters Patent:—

1. The combination of a seat and a support, the support embodying side members, the sides being provided with a plurality of slots and also provided with a plurality of sockets, the said sockets being positioned at different distances from the ends of the said sides and also at different heights from the bottoms of the said sides, the said slots being positioned at different heights from the bottoms of the said sides, the seat being provided with oppositely movable extensions adapted for engagement in some of the slots and movable therein, whereby the seat may be moved relatively to the support, the seat being also provided with other oppositely movable extensions adapted for engagement in some of the sockets, whereby the position of the seat is finally determined within the support.

2. The combination of a seat and a support, the seat being provided with a plurality of movable members adapted to be extended beyond the sides of the seat into engagement with the support in order to hold the seat in position, a shaft carried by the seat, the said movable members embodying racks, pinions carried by the said shaft for engagement with the racks, the shaft being movable in order to carry either pinion out of engagement with some of the racks, whereby the members actuated by the said racks may be left in engagement with the said support, the seat being thereby adjustable about the said supporting members, the shaft being provided with a plurality of recesses, the seat being provided with a plurality of resilient members for engagement in some of the recesses whereby, when the shaft is moved to a given position, the engagement of the said resilient members in the said recesses will hold it in such position.

3. The combination of a seat and a support, the seat being provided with a plurality of pairs of movable members adapted to be extended beyond the sides of the seat into engagement with the support, in order to hold the seat in position, a shaft carried by the seat and movable longitudinally, the said pairs of movable members embodying racks, means carried by the said shaft for engagement with the said racks, movement of the shaft carrying one of the said means out of engagement with some of the racks, movement in an opposite direction carrying the said means out of engagement with the other racks, whereby either pair of racks is independently movable in order to permit one pair of the said members to remain in engagement with the said support, whereby the seat may be moved relatively to the support, the final position of the seat being determined by movement of the other pair of racks in order to bring the other pair of members into engagement with the said support.

4. The combination of a seat and a support, the seat being provided with a plurality of pairs of movable members, each pair adapted to be extended beyond opposite sides of the seat into engagement with the support, a shaft carried by the seat, the shaft being provided with means for engagement with each pair of movable members, the shaft being longitudinally movable in order to carry the means thereon out of engagement with one pair of the said movable members, together with means carried by the seat for engagement with the shaft to hold the shaft in position to which it has been brought.

5. The combination of a seat and a support, the seat being provided with a plurality of pairs of movable members adapted to be extended beyond opposite sides of the seat into engagement with the support in order to position the seat, a shaft carried by the seat, means carried by the shaft for engagement with each pair of the said movable members, the shaft being longitudinally movable, whereby it may be brought out of operative relation with one of the said pairs of movable members, there being means carried by the seat for engagement with the shaft to hold it in position to which it has been brought by longitudinal movement, and other means for engagement with the shaft for preventing turning thereof.

In testimony whereof we have signed our names to this specification in the presence of two subscribing witnesses.

IRA L. STANGER.
CHARLES B. FITHIAN.

Witnesses:
  ALBERT GENTEL,
  EMMA EHRET.

---

Copies of this patent may be obtained for five cents each, by addressing the "Commissioner of Patents, Washington, D. C."